(12) United States Patent
Potoradi et al.

(10) Patent No.: US 9,160,206 B2
(45) Date of Patent: Oct. 13, 2015

(54) PERMANENT-MAGNET-EXCITED ELECTRIC MOTOR WITH HEATING DEVICE, AND OPERATING METHOD

(75) Inventors: Detlef Potoradi, Bad Neustand/Saale (DE); Rolf Vollmer, Gersfeld (DE); Dirk Van Riesen, Tauberbischofsheim (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 257 days.

(21) Appl. No.: 13/992,677

(22) PCT Filed: Nov. 28, 2011

(86) PCT No.: PCT/EP2011/071191
§ 371 (c)(1),
(2), (4) Date: Jun. 7, 2013

(87) PCT Pub. No.: WO2012/076357
PCT Pub. Date: Jun. 14, 2012

(65) Prior Publication Data
US 2013/0249340 A1  Sep. 26, 2013

(30) Foreign Application Priority Data
Dec. 8, 2010 (EP) .................................... 10194160

(51) Int. Cl.
*H02K 21/12* (2006.01)
*H02K 1/27* (2006.01)
*H02K 21/02* (2006.01)
*H02K 15/12* (2006.01)

(52) U.S. Cl.
CPC .................. *H02K 1/27* (2013.01); *H02K 21/02* (2013.01); *H02K 15/125* (2013.01)

(58) Field of Classification Search
CPC ....... H02K 15/125; H02K 1/27; H02K 1/278; H02K 1/2786; H02K 21/16
USPC ........................................ 310/156.01–156.84
See application file for complete search history.

(56) References Cited

U.S. PATENT DOCUMENTS

| 7,969,057 B2 * | 6/2011 | Kusase et al. ................. 310/181 |
| 2011/0083467 A1 | 4/2011 | Asano et al. |
| 2011/0234180 A1 * | 9/2011 | Cullen et al. .................... 322/89 |

FOREIGN PATENT DOCUMENTS

| CN | 2231455 Y | 7/1996 |
| CN | 1373550 A | 10/2002 |
| EP | 2 306 105 A1 | 4/2011 |
| JP | H11166500 A | 6/1999 |
| WO | WO 2009/151033 A1 | 12/2009 |

OTHER PUBLICATIONS

International Search Report issued by the European Patent Office in International Application PCT/EP2011/071191, Dec. 11, 2012.

* cited by examiner

*Primary Examiner* — Hanh Nguyen
(74) *Attorney, Agent, or Firm* — Henry M. Feiereisen LLC

(57) ABSTRACT

The aim of the invention is to provide an electric motor which has a high torque at low rotation speeds and a high power at high rotation speeds. The invention therefore proposes an electric motor with permanent-magnet excitation having a first active part (10), which is fitted with permanent magnets (11), and a second active part (10), which can be moved in relation to the first active part (10) by magnetic force of the permanent magnets (11). The electric motor also has a heating device (12) with which the magnetic field of at least one of the permanent magnets (11) can be weakened by heating the permanent magnets as a function of a speed of the first active part (10) in relation to the second active part (8).

5 Claims, 3 Drawing Sheets

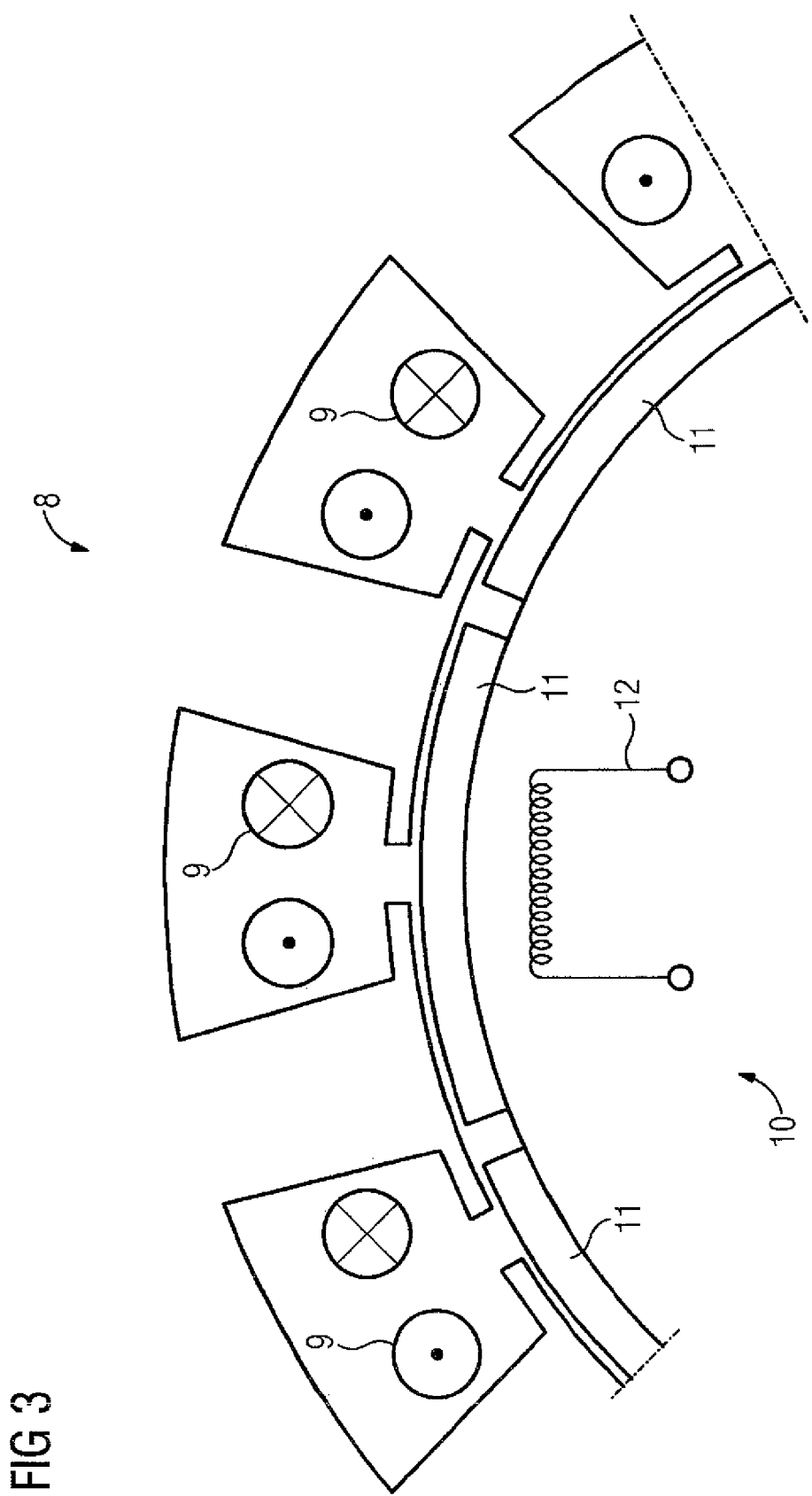

US 9,160,206 B2

PERMANENT-MAGNET-EXCITED ELECTRIC MOTOR WITH HEATING DEVICE, AND OPERATING METHOD

CROSS-REFERENCES TO RELATED APPLICATIONS

This application is the U.S. National Stage of International Application No. PCT/EP2011/071191, filed Nov. 28, 2011, which designated the United States and has been published as International Publication No. WO 2012/076357 and which claims the priority of European Patent Application, Serial No. 10194160.7, filed Dec. 8, 2010, pursuant to 35 U.S.C. 119 (a)-(d).

BACKGROUND OF THE INVENTION

The present invention relates to a permanent-magnet-excited electric motor having a first active part which is fitted with permanent magnets, and a second active part which can be moved relative to the first active part by means of magnetic force of the permanent magnets. The present invention further relates to a method for operating a permanent-magnet-excited electric motor of the aforesaid type.

The torque of electric motors typically decreases as rotational speed increases. This is illustrated by way of example in the diagram according to FIG. 1. Characteristic curve 1 represents a permanent magnet (PM) synchronous motor having strong permanent magnets. Their residual induction $B_r$ equals 1.1 T. At low rotational speeds the synchronous motor possesses a torque of up to 25 Nm and more. The torque decreases rapidly with increasing rotational speed and reaches the value 0 Nm at around 4500 $\min^{-1}$. This means that said synchronous machine possesses high torque at low rotational speeds, yet only low output power at high rotational speeds.

Characteristic curve 2 in FIG. 1 represents a PM synchronous motor having weaker permanent magnets. At low rotational speeds the torque reaches almost 20 Nm and then drops to 0 Nm at approximately 6200 $\min^{-1}$. In the case of these permanent magnets the residual induction $B_r$ amounts to 0.8 T. Thus, although the synchronous machine has a lower torque at low rotational speeds, it already has a higher output power at higher rotational speeds.

Characteristic curve 3 likewise represents a PM synchronous motor having relatively weak permanent magnets. in this case the residual induction $B_r$ equals 0.4 T. At low rotational speeds the torque attains the value 10 Nm. The torque decreases only slowly and at 8000 $\min^{-1}$ still has a value of approximately 5 Nm. This in turn means that at low rotational speeds the PM synchronous motor possesses a low torque, yet at high rotational speeds it can in contrast deliver very high output power.

The permanent magnets of a synchronous machine should therefore be chosen according to their desired operating point (rotational speed). If a high torque at low rotational speeds is required, then strong permanent magnets need to be employed. If, on the other hand, high output power at high rotational speeds is required, then weaker permanent magnets should be used for preference.

If it is aimed to achieve a high torque at low rotational speed and high output power at high rotational speeds, then use is made of the field weakening effect of the permanent magnets in PM machines. This is achieved by impressing a direct-axis current component whose field overlays the field of the permanent magnets and thereby weakens said field. A disadvantage thereof is on the one hand that for its part said field-weakening current generates losses in the windings. On the other hand the impressed current must not be allowed to become too strong so that the permanent magnets are not irreversibly weakened. Furthermore harmonic fields are produced due to saturation, which again increase the iron losses.

SUMMARY OF THE INVENTION

The object of the present invention is therefore to provide a permanent-magnet-excited electric motor by means of which it is possible to achieve a high torque at low rotational speeds and high output power at high rotational speeds without the above-cited disadvantages. A further object is to provide a corresponding method for operating an electric motor.

This object is achieved according to the invention by means of a permanent-magnet-excited electric motor having a first active part which is fitted with permanent magnets, and a second active part which can be moved relative to the first active part by means of magnetic force of the permanent magnets, and having a heating device by means of which the magnetic field of at least one of the permanent magnets can be weakened by heating the permanent magnet as a function of a speed of the first active part relative to the second active part.

Also provided according to the invention is a method for operating a permanent-magnet-excited electric motor having a first active part which is fitted with permanent magnets, and a second active part which can be moved relative to the first active part by means of magnetic force of the permanent magnets, by moving the first active part relative to the second active part, and by heating at least one of the permanent magnets as a function of a speed of the first active part relative to the second active part such that the magnetic field of the permanent magnet is weakened.

Advantageously the magnetic field of the permanent magnets is truly weakened as a result of the heating, because the residual induction $B_r$ decreases with rising temperature. The permanent magnets are therefore operated at a lower temperature at low rotational speeds and at a significantly higher temperature at a higher rotational speed, since they are intentionally heated in addition by means of the heating device e.g. at the high rotational speeds.

Preferably the first active part is a rotor and the second active part is a stator, the speed of the two active parts relative to each other being produced as a result of the rotational speed of the rotor. In principle, of course, a linear motor can also benefit from the present invention, in which case the first active part is then the primary part and the second active part the secondary part, or vice versa.

Furthermore all the permanent magnets of the first active part can be heatable as a function of the speed by means of the heating device. Depending on the desired objective, therefore, either only individual magnets or all, of the permanent magnets can be heated in order to reduce their residual induction.

In a special embodiment variant the heating device can have a separate heating element with respect to the second active part, in particular a heating coil or a heating resistor. Alternatively it is also possible to use Peltier elements or other components for heating purposes. Also installed in the electric motor in this embodiment variant in addition to the first and second active part is a further separate device, namely the heating device, in order to heat the permanent magnets of the first active part. This has the advantage that the active parts can be controlled completely independently of the heating device.

According to an alternative embodiment variant the second active part is used in addition for heating the permanent magnets of the first active part. The heating device therefore comprises the second active part and a control device by means of which a clock frequency and/or a signal pattern of the control signal can be set for the second active part for the purpose of the selective heating of the first active part or, more specifically, of the magnets of the first active part. This embodiment variant has the advantage that no additional elements need to be provided in the electric motor in order to heat the permanent magnets. Rather, the heating is provided through the judicious actuation of the second active part by means of a control signal such that currents are induced in the first active part which provoke corresponding losses that lead to a (usually unwanted) heating.

In a particularly advantageous manner the temperature coefficient of the residual induction of the magnetic material possesses an average value between −0.4%/° C. and −0.6%/° C. in the temperature range from 20° C. to 150° C. In this case the temperature coefficient represents a linearized value (slope) of the temperature profile of the residual induction. This results in the generation of a clear temperature dependence, though this is not yet so strong that a significant field weakening is already produced as a result of minimum self-heating.

In the method according to the invention the permanent magnet is therefore heated as a function of the speed of the first active part or rotor in order to weaken its magnetic field. The two aforementioned methods are also available for this inventive method. Firstly the additionally required heat can be obtained by means of thermal energy from a separate heating element or else by means of specific actuation of the second active part and induction in the first active part. In the latter case the clock frequency and/or a signal pattern of the control signal for actuating the second active part at a given speed are/is chosen such that the thermal losses caused due to induction in the first active part are significantly greater than a minimum thermal loss that becomes established when the first active part is not intentionally heated.

BRIEF DESCRIPTION OF THE DRAWING

The present invention will now be explained in more detail with reference to the attached drawings, in which:

FIG. 3 shows a cross-section through a part of a PM synchronous motor having separate heating for the permanent magnets.

DETAILED DESCRIPTION OF PREFERRED EMBODIMENTS

The exemplary embodiments described in greater detail below constitute preferred embodiment variants of the present invention.

Figure 1:
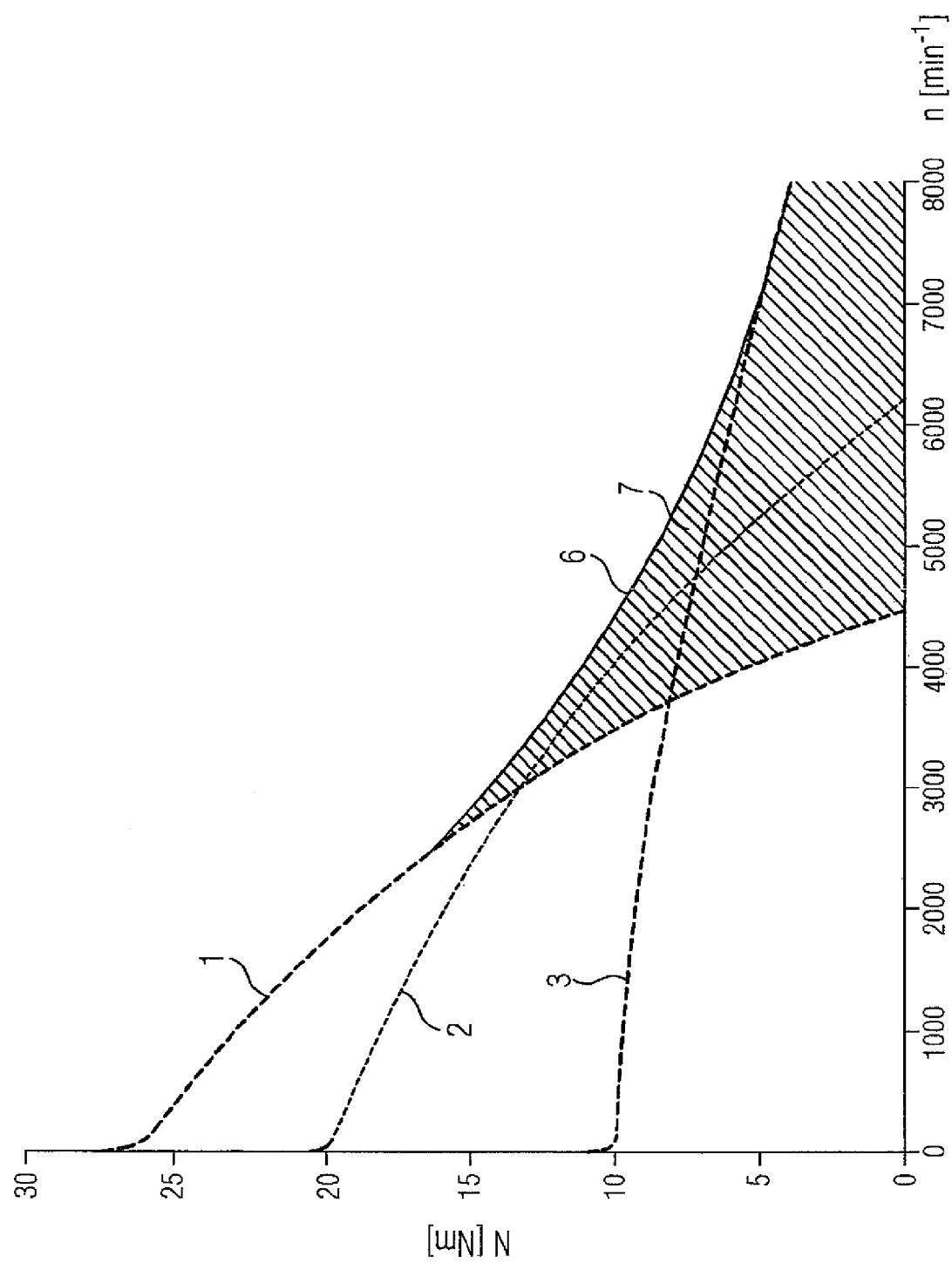
FIG. 1 shows a diagram of continuous torques over the rotational speed of PM, synchronous machines having different permanent magnets.

As was mentioned in the introduction, the aim is to build an electric machine (in particular synchronous machine) having permanent magnet excitation (PM machine) which possesses a high torque at low rotational speeds and high output power at high rotational speeds (cf. FIG. 1). The torque of a PM machine is proportional to the air-gap flux density and therefore to the residual induction of the magnets. The iron losses at the rotational speed are also dependent on the flux density and therefore on the residual induction, with the result that there is an optimum residual induction for each operating point (operating speed). The following applies by approximation to the thermally permissible torque or the optimum efficiency:

$$M(B_r, n) = c \cdot B_r - c_1 \cdot B_r^2 \cdot n^2$$

$$\eta(B_r, n) = \frac{k \cdot B_r \cdot n - k_1 \cdot B_r^2 \cdot n^2}{k \cdot B_r \cdot n + k_2 \cdot \frac{1}{B_r^2}}$$

Here, $B_r$ represents the residual induction and n the rotational speed of the rotor of the PM machine. The letters c, $c_1$, k, $k_1$ and $k_2$ represent constants. The torque M and the efficiency $\eta$ are therefore functions of the residual induction $B_r$ and the rotational speed n. For each rotational speed the torque can therefore be represented over the residual induction as a parabola with upward-pointing peak. The optimum residual induction value for the respective rotational speed can be identified at the maximum.

The higher the rotational speed, the lower the residual induction must be in order to reach the maximum torque and optimum efficiency. The aim is now to achieve a true speed-dependent field weakening, for example in the case of a PM synchronous machine. This is realized by means of a selective increase in the temperature of the permanent magnets above the minimum temperature that becomes established during normal operation with the aim of keeping thermal losses to a minimum. In order to enable the field weakening effect due to additional heat to be exploited more beneficially, special magnetic materials should be used.

Figure 2:
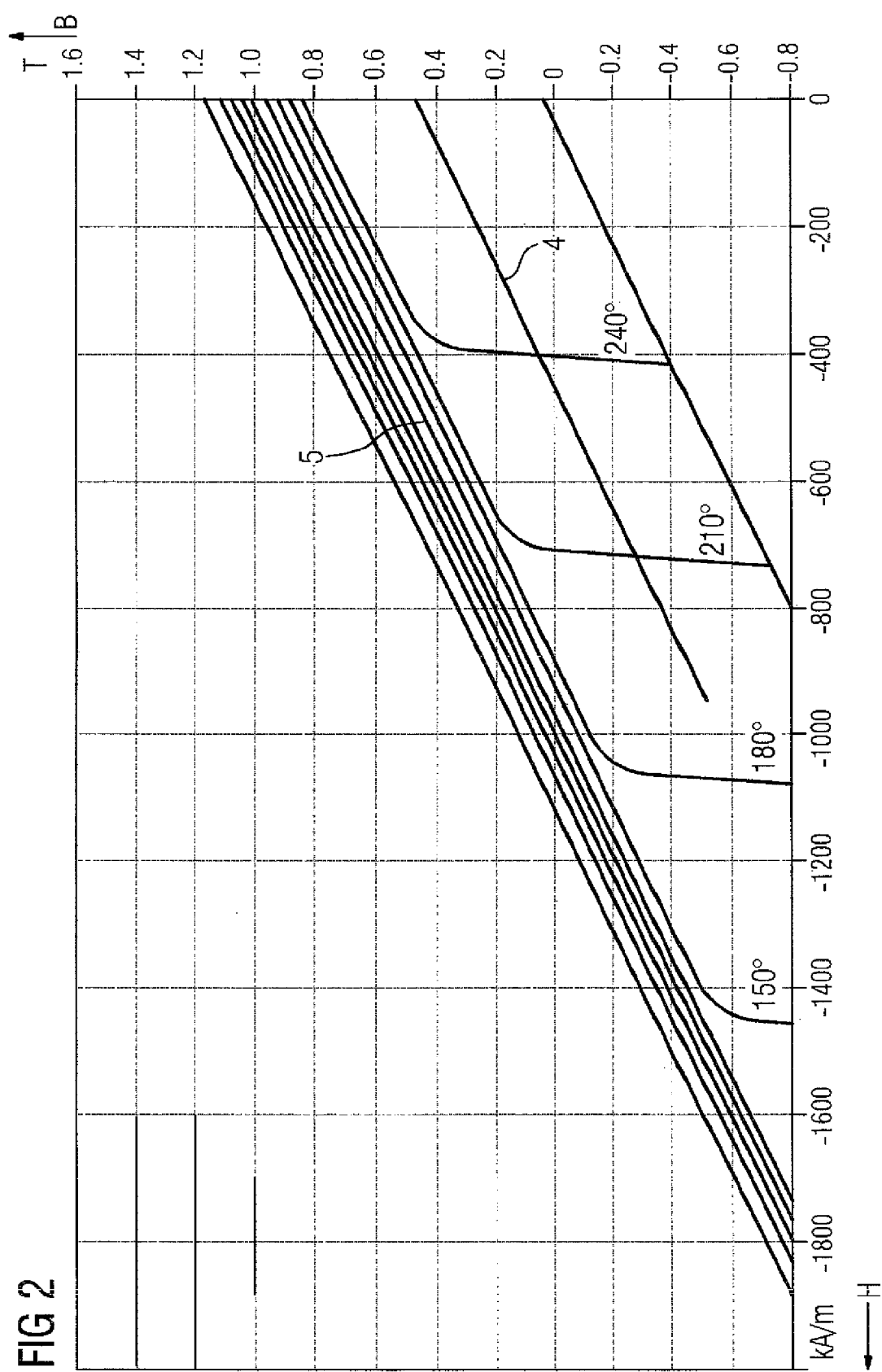
FIG. 2 shows demagnetization curves for a magnetic material at different temperatures.

FIG. 2 shows demagnetization curves at different temperatures for a typical magnetic material. The residual induction values $B_r$ can be read from the ordinate and the coercive field strengths at B=0 T on the abscissa. Given a temperature increase from 20° C. to 240° C., the residual induction $B_r$ for this material therefore decreases from slightly below 1.2 T to slightly above 0.8 T. This is equivalent to a temperature coefficient TK ($B_r$) of the residual induction of approximately −0.11%/° C. Typical values for this temperature coefficient lie between −0.09%/° C. and −0.11%/° C. However, to ensure the field weakening intensifies with increasing temperature, a material having a temperature coefficient in the range from −0.4%/° C. to −0.6%/° C. should be chosen. The demagnetization curve for a material of said type is labeled with reference numeral 4 in FIG. 2. Said demagnetization curve 4 applies to the temperature of 150° C. For the typical magnetic material, in contrast, demagnetization curve 5 results for 150° C. The substantially higher temperature dependence of the material having demagnetization curve 4 is clearly evident. With the magnetic material according to demagnetization curve 4 it is possible to weaken the field of the permanent magnet by increasing its temperature. The maximum coercive field strength and hence the demagnetization resistance of the magnet, on the other hand, should change as little as possible with the temperature (TK($H_c$)). The knee of demagnetization curve 4 should also lie for example at approximately −1200 kA/m as in the case of demagnetization curve 5 of the typical magnetic material.

The decrease in the residual induction. $B_r$ due to the inventive heating as a function of the rotational speed now results in the PM machine being equipped with strong magnets at low rotational speeds and with weak magnets at high rotational speeds. Referring to FIG. 1, the maximum torque due to the speed-dependent heating of the permanent magnets now runs along curve 6, which runs along curve 1 at low rotational speeds and along curve 3 at high rotational speeds. Thus, whereas only the area below curve 1 could be used previously in the case of PM machines having a magnetic material for example corresponding to curve 1, the additional application area 7 of the PM machine, shown hatched in FIG. 1, is yielded for the same material by virtue of the invention. It is therefore easy to see that as a result of the heating of the permanent magnets as a function of the rotational speed, and hence as a result of the reduction in the residual induction as a function of the rotational speed, high output power can also be tapped at high rotational speeds and at the same time a high torque is available at low rotational speeds.

The increase in the temperature of the magnet can be achieved in different ways. On the one hand the magnet or permanent magnet can be heated by means of a separate suitable heating device, as symbolized in FIG. 3. The stator 8 (second active part) can be seen there with its windings 9. A rotor 10 (first active part) having permanent magnets 11 is arranged radially inside the stator 8. A heating element 12 is indicated symbolically below a permanent magnet 11. The heating element 12 can be a heating coil, a simply mounted heating resistor, a heated filament, a Peltier element or the like. What is important with this type of heating is that it is separate with respect to the other components of the electric motor and in particular with respect to the stator 8 (second active part). The heating element 12 is controlled independently of the winding 9 of the stator 8.

According to another embodiment variant the permanent magnets 11 can also be heated by means of the stator 8, i.e. indirectly by way of the second active part. This can be achieved by means of the iron losses in the rotor 10 and eddy current losses in the magnet 11. This is because said losses are dependent on the clock frequency of an inverter and on the switching pattern or pulse duty factor of the control signal by means of which the PM machine is controlled. The clock frequency and the switching pattern or pulse duty factor can be set in a suitable control device which actuates the PM machine. In this case the control device typically comprises the inverter. The heating is therefore caused here by corresponding actuation of the stator, whereas in the previous example it is accomplished by corresponding actuation of a separate heating element in or on the rotor.

The desired heating of the permanent magnets at high rotational speeds can also be easily achieved as follows. The iron losses are high, including in the rotor 10, at higher rotational speeds. This causes the rotor 10 and consequently the magnet or magnets 11 to heat up, resulting in an automatic field weakening which is desired at the higher rotational speeds. In order to achieve the desired effect to a satisfactory extent it is then necessary to choose a suitable material corresponding to demagnetization curve 4 of FIG. 2 and having a sufficiently high temperature coefficient in terms of absolute value. This can also be utilized for self-regulation purposes in order to prevent overloading of the motor.

Overall it can therefore be stated that electromechanical energy converters (such as the PM synchronous motor described hereinabove) which apply field weakening by means of the described magnets and the technique according to the invention possess lower losses at high rotational speeds, lower stator heating and better efficiency.

The invention claimed is:

1. A permanent-magnet-excited electric motor comprising
a first active part fitted with permanent magnets;
a second active part capable of moving relative to the first active part by magnetic force of the permanent magnets; and
a heating device capable of weakening a magnetic field of at least one of the permanent magnets by heating the permanent magnet as a function of a speed of the first active part relative to the second active part, said heating device having a heating element which is separate from the second active part and embodied as a heating coil, a heated filament, a Peltier element or a heating resistor.

2. The permanent-magnet-excited electric motor of claim 1, wherein the first active part is a rotor and the second active part is a stator, with the speed being established by a rotational speed of the rotor.

3. The permanent-magnet-excited electric motor of claim 1, wherein the heating device is capable of heating all the permanent magnets of the first active part as a function of the speed.

4. The permanent-magnet-excited electric motor of claim 1, wherein a temperature coefficient of a residual induction of the permanent magnet in a temperature range from 20° C. to 150° C. has an average value between −0.4%/° C. and −0.6%/° C.

5. A method for operating a permanent-magnet-excited electric motor, comprising:
moving a first active part of the electric motor relative to a second active part of the electric motor by magnetic force of permanent magnets fitted on the first active part; and
heating at least one of the permanent magnets as a function of a speed of the first active part relative to the second active part such that a magnetic field of the permanent magnet is weakened, wherein the permanent magnet is heated by thermal loss of the second active part and by thermal energy from a heating element which is embodied as a heating coil, a heated filament, a Peltier element or a heating resistor.

* * * * *